United States Patent
Oswald et al.

(10) Patent No.: US 6,679,945 B2
(45) Date of Patent: Jan. 20, 2004

(54) PYROGENICALLY PREPARED SILICON DIOXIDE

(75) Inventors: Monika Oswald, Hanau (DE); Gerrit Schneider, Hanau (DE); Klaus Deller, Hainburg (DE)

(73) Assignee: Degussa AG, Düsseldorf (DE)

( * ) Notice: Subject to any disclaimer, the term of this patent is extended or adjusted under 35 U.S.C. 154(b) by 79 days.

(21) Appl. No.: 09/931,161

(22) Filed: Aug. 17, 2001

(65) Prior Publication Data

US 2002/0044903 A1 Apr. 18, 2002

(30) Foreign Application Priority Data

Aug. 21, 2000 (DE) .......................... 00 117 922
Jul. 3, 2001 (DE) .......................... 01 115 613

(51) Int. Cl.[7] ............ C04B 14/04; C03C 3/00; C03C 6/04; B01J 211/08; B01J 20/10; C01B 33/12
(52) U.S. Cl. ............ 106/482; 106/481; 106/287.34; 501/11; 501/31; 501/133; 501/154; 502/232; 502/407; 502/409; 423/335
(58) Field of Search ............ 106/482, 481, 106/287.34; 501/11, 31, 133, 154; 502/232, 407, 409; 423/335

(56) References Cited

U.S. PATENT DOCUMENTS

| | | | |
|---|---|---|---|
| 4,248,600 A | * 2/1981 | Almagro | 23/293 R |
| 4,274,883 A | * 6/1981 | Lumbeck et al. | 106/308 Q |
| 5,021,378 A | * 6/1991 | Deller et al. | 502/62 |
| 5,116,535 A | 5/1992 | Cochrane | 252/313 |
| 5,472,493 A | * 12/1995 | Regan | 106/491 |
| 5,776,240 A | * 7/1998 | Deller et al. | 106/482 |
| 5,827,363 A | * 10/1998 | Darsillo et al. | 106/484 |
| 6,063,354 A | 5/2000 | Mangold et al. | 423/336 |
| 6,193,795 B1 | * 2/2001 | Nargiello et al. | 106/484 |
| 6,207,610 B1 | * 3/2001 | Krause et al. | 502/232 |

FOREIGN PATENT DOCUMENTS

| | | |
|---|---|---|
| CA | 2227709 | 7/1998 |
| EP | 855 368 | 7/1998 |

OTHER PUBLICATIONS

European Search Report dated Feb. 9, 2001.
European Search Report dated Jan. 3, 2002 for counterpart application EP 01 71 0041.

* cited by examiner

*Primary Examiner*—Mark L. Bell
*Assistant Examiner*—Patricia L. Hailey
(74) *Attorney, Agent, or Firm*—Smith, Gambrell & Russell, LLP

(57) ABSTRACT

Pyrogenically prepared silicon dioxide with the following physicochemical properties:

1. Average particle size ($D_{50}$ value) $D_{50} \geqq 150$ nm (dynamic light scattering, 30 wt %)
2. Viscosity (5 rpm, 30 wt %) $\eta \leqq 100$ m·Pas
3. Thixotropy of $T_i$ ($\eta$(5 rpm))/($\eta$(50 rpm))$\leqq 2$
4. BET surface area 30–60 m$^2$/g
5. Compacted bulk=100–160 g/L
6. Original pH$\leqq 4.5$ can be used for the preparation of dispersions and glass bodies.

3 Claims, No Drawings

PYROGENICALLY PREPARED SILICON DIOXIDE

The present invention relates to a pyrogenically prepared silicon dioxide.

Pyrogenically prepared silicon dioxide or pyrogenically prepared silica is known from Ullmann's Encyclopedia of Industrial Chemistry, 4$^{th}$ edition, Volume 21, page 464.

It is known to use pyrogenically prepared silicon dioxide in the preparation of glass bodies (U.S. Pat. No. 5,207,814, EP 0 586 013 B1, EP 0 705 797 A2, EP 0 131 057 B1, U.S. Pat. Nos. 4,681,615, 4,801,318). Other uses for silica are numerous and are well known in the art.

The known pyrogenically prepared silicon dioxide has the drawback of presenting an unsatisfactory viscosity behavior in the dispersion used for the preparation of glass.

Thus, an object of the present invention is to overcome the problems relating to pyrogenically prepared silicon dioxide for use in the production of glass.

SUMMARY OF THE INVENTION

The above and other objects of the present invention can be achieve by using a pyrogenically prepared silicon dioxide with the following physicochemical properties:

1. Average particle size ($D_{50}$ value) $D_{50} \geq 150$ nm (dynamic light scattering, 30 wt%)
2. Viscosity (5 rpm, 30 wt%)$\eta \leq 100$ m·Pas
3. Thixotropy of $T_i$ ($\eta$(5 rpm))/($\eta$(50 rpm)) $\leq 2$
4. BET surface area 30–60 m$^2$/g
5. Compacted bulk density SD =100–160 g/L
6. Original pH$\leq 4.5$ The pyrogenically produced silicon dioxide of the invention has deacidification index of less than 3% in a weight basis.

Measurement methods

Particle Size

Measurement method used according to the invention: Photon correlation spectroscopy (PCS) is a dynamic light scattering process which allows the detection of particles in the range of approximately 5 nm to 5 μm. From the measurement results one can also calculate a particle size distribution in addition to the mean particle diameter.

Light source: 650 nm diode laser

Geometry: 180° homodyne scattering

Sample quantity: 2 mL

Calculation of the distribution according to the Mie theory

Procedure: 2 mL of dispersion (30 mol %) are introduced into a measurement cuvette, the temperature sensor is inserted, and the measurement is started. The measurement is carried out at room temperature.

Viscosity

Measurement method for determining viscosity: A programmable rheometer is available to examine complex flow behaviors, and it is equipped with standard rotation spindles.

Shearing rate: 5–100 rpm

Measurement temperature: room temperature (23° C.)

Dispersion concentration: 30 mol %

Procedure: 500 mL of dispersion are introduced into a 600-mL glass beaker and examined at room temperature (statistical determination of the temperature via measurement sensors) at different shearing rates.

BET: based on DIN 66131

Compacted bulk density: based on DIN ISO 787/XI K 5101/18 (not sieved)

pH: based on DIN ISO 787/IX, ASTM D 1280, JIS K 5101/24.

The pyrogenically prepared silicon dioxide according to the invention can be prepared by mixing a volatile silicon compound, such as, for example, silicon tetrachloride or trichloromethylsilane with an oxygen-containing gas and hydrogen, and by burning this gas mixture in a flame.

The pyrogenically prepared silicon dioxide according to the invention can be used advantageously for the preparation of dispersions in aqueous and/or nonaqueous solvents.

An additional feature of the invention is a dispersion in aqueous and/or nonaqueous solvents, which dispersion contains the pyrogenically prepared silicon dioxide according to the invention.

The pyrogenically prepared silicon dioxide according to the invention as well as the dispersion according to the invention can be used for the preparation of glass bodies, for example, using the sol-gel method.

The pyrogenically prepared silicon dioxide according to the invention, in the form of the aqueous dispersion, presents an advantageous low viscosity.

EMBODIMENTS EXAMPLES

Example 1

Preparation of a Dispersion 245 g of distilled water are introduced into a glass beaker and, using an organic base, preferably TMAH (tetramethylammonium hydroxide), the pH is adjusted to 11.

Then, using a dissolver with a dissolver disk, 105 g of pyrogenic oxide are introduced into the water. The rpm of the dissolver is approximately 1000 rpm. After the oxide has been completely worked into the dispersion, the dispersion is subjected to a predispersion for 10–30 min.

Then the dispersion is dispersed for 10–30 min using an Ultra-Turrax rotor-stator dispersion apparatus at 10,000 rpm.

The viscosity of the dispersion is 40 mPas at a rotation speed of 5 rpm.

Comparative Example 1

Preparation of a Dispersion 245 g of distilled water are introduced into a glass beaker and the pH is adjusted with an organic base, preferably TMAH (tetramethylammonium hydroxide) to 11.

Then, using a dissolver with a dissolver disk, 105 g of conventional pyrogenic oxide are introduced into the water. The rpm of the dissolver is approximately 1000 rpm. After the oxide has been completely worked into the dispersion, the dispersion is subjected to a dispersing action by means of a dissolver for 10–30 min.

Then, the dispersion is farther dispersed for 10–30 min with an Ultra-Turrax rotor-stator rotor-stator dispersion apparatus at 10,000 rpm. The viscosity of the dispersion is 240 mPas at a rotation speed of 5 rpm.

Example 2

17.2 g of the pyrogenic oxide are stirred with 27 mL of distilled water and 2.57 mL of TMAH (tetramethylammonium hydroxide) to make a homogeneous dispersion, as described in Example 1. After finishing the dispersion, 10 mL of acetic acid ethyl ester are added, and the dispersion is immediately poured into a mold.

After 12 min, the dispersion is gelled, and the gel body produced is removed after one hour from the mold and dried for 6 days at room temperature.

As a result of the drying, a microporous green body is produced. The green body is then sintered for four hours by zone sintering under a vacuum at 1400° C. A sintered glass body without visible bubbles or pores is produced.

The silica according to the present invention are prepared as described below.

Example A: (Comparative Example)

600 kg/h $SiCl_4$ are vaporized at about 90° C. and are conveyed to the central pipe of a conventional burner. Into this pipe there is then introduced 172 $Nm^3/h$ hydrogen as well as 245 $Nm^3/h$ air with an increased oxygen content of 35 volume %. This gaseous mixture is then ignited and burned in the combustion chamber of a water cooled flame reactor. In a central nozzle of a surrounding jacketed nozzle there is introduced 15 $Nm^3/h$ hydrogen to reduce the tendency of forming a baked on coating. In the flame reactor there is additionally injected 290 $Nm^3/h$ air of normal composition.

After the cooling off of the reaction gases, the pyrogenic silica is separated from the hydrogen chloride containing gases in the filter unit. In a deacidification unit, the pyrogenic silica is treated for 20 seconds dwell time at a temperature of 600 ° C. with steam and air, whereby the deacidification index DI of 6.2% by weight is obtained.

The deacidification index is defined as the relationship in weight units of the introduced steam to the deacidified pyrogenic silica:

$$DI=(m\ H_2O/m\ SiO_2)\times 100\%$$

where m=mass.

When this silica is formed into a dispersion according to comparative example 1, there results a viscosity of 240 mPas in a 30% aqueous dispersion.

Example B

Preparation of a pyrogenic silica according to the invention with a low viscosity in a disperation.

600 kg/h $SiCl_4$ are vaporized at about 90 ° C. and are conveyed in the central pipe of a conventional burner. Into this pipe there is introduced 172 $Nm^3/h$ hydrogen as well as 245 $Nm^3/h$ air with an increased oxygen content of 35% by volume. This gaseous mixture is then ignited and burned in the combustion chamber of a water cooled flame reactor. In the central nozzle of the surrounding jacketed nozzle there is introduced 15 $Nm^3/h$ of hydrogen in order to avoid formation of baked on coatings. Then in the flame reactor 290 $Nm^3/h$ normal air is injected.

After the cooling off of the reaction gases, the pyrogenic silica is separated from the hydrogen chloride containing gas in a filter unit. In a deacidification unit, the pyrogenic silica is treated for 20 seconds dwell time at 600° C. with steam and air, whereby a deacidification index DI of 0.95% by weight if obtained.

When this silica is converted into a dispersion according to example 1, there is obtained a viscosity value of 40 mPas in a 30% aqueous dispersion.

TABLE 1

Conditions for the Preparation of Pyrogenic Silica

| Nr. | $SiCl_4$ Kg/h | Primary air enriched $Nm^3/h$ | $H_2$ Core $Nm^3/h$ | $H_2$ Jacket $Nm^3/h$ | BET $M^2/g$ | D1 [%] | Viscosity 30% [mPas] |
|---|---|---|---|---|---|---|---|
| A | 600 | 245 | 172 | 15 | 50 | 6.2 | 240 |
| B | 600 | 245 | 172 | 15 | 50 | 0.95 | 40 |

D1 = Deacidification Index

Further variations and modifications of the foregoing will be apparent to those skilled in the art and are intended to be encompassed by the claims appended hereto.

EP priority applications 00 117 922.5 of Aug. 21, 2000 and 01 115 613.0 of Jul. 3, 2001 are relied on and incorporated herein by reference.

We claim:

1. A pyrogenically prepared silicon dioxide with the following physicochemical properties;
 a) average particle size ($D_{50}$ value) $D_{50} \geq 150$ nm (dynamic light scattering, 30 wt %);
 b) viscosity (5 rpm, 30 wt %) $\eta \leq 100$ m·Pas;
 c) thixotropy of $T_i$: $(\eta(5\ rpm))/(\eta(50\ rpm)) \leq 2$;
 d) BET surface area 30–60 $m^2/g$;
 e) compacted bulk=100–160 g/L; and
 f) original pH$\leq$4.5.

2. A dispersion, containing a pyrogenically prepared silicon dioxide according to claim 1.

3. A pyrogenically produced silicon dioxide which has a deacidification index of less than 3% on a weight basis.

* * * * *

UNITED STATES PATENT AND TRADEMARK OFFICE
CERTIFICATE OF CORRECTION

PATENT NO.     : 6,679,945 B2
DATED          : January 20, 2004
INVENTOR(S)    : Oswald, Monika et al.

It is certified that error appears in the above-identified patent and that said Letters Patent is hereby corrected as shown below:

<u>Title page,</u>
Item [30], Foreign Application Priority Data, should read as follows:
-- Aug. 21, 2000 (EP)          00 117 992
   Jul 3, 2001 (EP)            01 115 613 --

Signed and Sealed this

Eighteenth Day of May, 2004

JON W. DUDAS
*Acting Director of the United States Patent and Trademark Office*